(12) United States Patent
Mizuno et al.

(10) Patent No.: US 8,261,721 B2
(45) Date of Patent: Sep. 11, 2012

(54) ABNORMALITY DIAGNOSING SYSTEM FOR INTERNAL COMBUSTION ENGINE

(75) Inventors: Hiroyuki Mizuno, Toyota (JP); Naoya Okubo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 286 days.

(21) Appl. No.: 12/822,637

(22) Filed: Jun. 24, 2010

(65) Prior Publication Data

US 2011/0017176 A1    Jan. 27, 2011

(30) Foreign Application Priority Data

Jul. 21, 2009    (JP) ................................. 2009-170195

(51) Int. Cl.
*F02D 41/22* (2006.01)

(52) U.S. Cl. ........................................ 123/479; 123/431

(58) Field of Classification Search .................. 123/431, 123/479, 486

See application file for complete search history.

(56) References Cited

U.S. PATENT DOCUMENTS

| | | | | |
|---|---|---|---|---|
| 7,258,103 | B2 * | 8/2007 | Tahara et al. | 123/431 |
| 8,091,538 | B2 * | 1/2012 | Hartmann et al. | 123/690 |
| 8,170,775 | B2 * | 5/2012 | Hori | 701/107 |
| 2006/0207564 | A1 * | 9/2006 | Kinose | 123/431 |
| 2006/0213482 | A1 * | 9/2006 | Shibagaki et al. | 123/396 |

FOREIGN PATENT DOCUMENTS

| | | |
|---|---|---|
| JP | A-06-129299 | 5/1994 |
| JP | A-09-152902 | 6/1997 |
| JP | A-11-229932 | 8/1999 |
| JP | 2006-258018 A | 9/2006 |
| JP | 2006-258024 A | 9/2006 |
| JP | 2006-258031 A | 9/2006 |
| JP | A-2006-258018 | 9/2006 |
| JP | A-2006-258024 | 9/2006 |
| JP | A-2006-258031 | 9/2006 |

OTHER PUBLICATIONS

Office Action issued in Japanese Patent Application No. 2009-170195 dated Apr. 19, 2011 (with partial translation).

* cited by examiner

*Primary Examiner* — Erick Solis
(74) *Attorney, Agent, or Firm* — Oliff & Berridge, PLC

(57) ABSTRACT

An abnormality diagnosing system for an internal combustion engine including a first fuel injection valve that injects fuel into a cylinder, and a second fuel injection valve that injects fuel into an intake passage is provided which has a control device controls an injection pattern of the first fuel injection valve and the second fuel injection valve. The control device stores engine operating conditions when an abnormality occurs in the engine, and make a return-to-normal determination as to whether the engine returns to a normal operating state when similar operation conditions that are the same as or within predetermined ranges of the stored operating conditions are established. The injection pattern is selected from patterns in which the fuel is injected solely from the first fuel injection valve, solely from the second fuel injection valve, and from both of the first and second fuel injection valves. The control device stores the injection pattern when the abnormality occurs, and makes a return-to-normal determination on condition that the engine is operating in an injection pattern that is the same as the stored injection pattern.

15 Claims, 12 Drawing Sheets

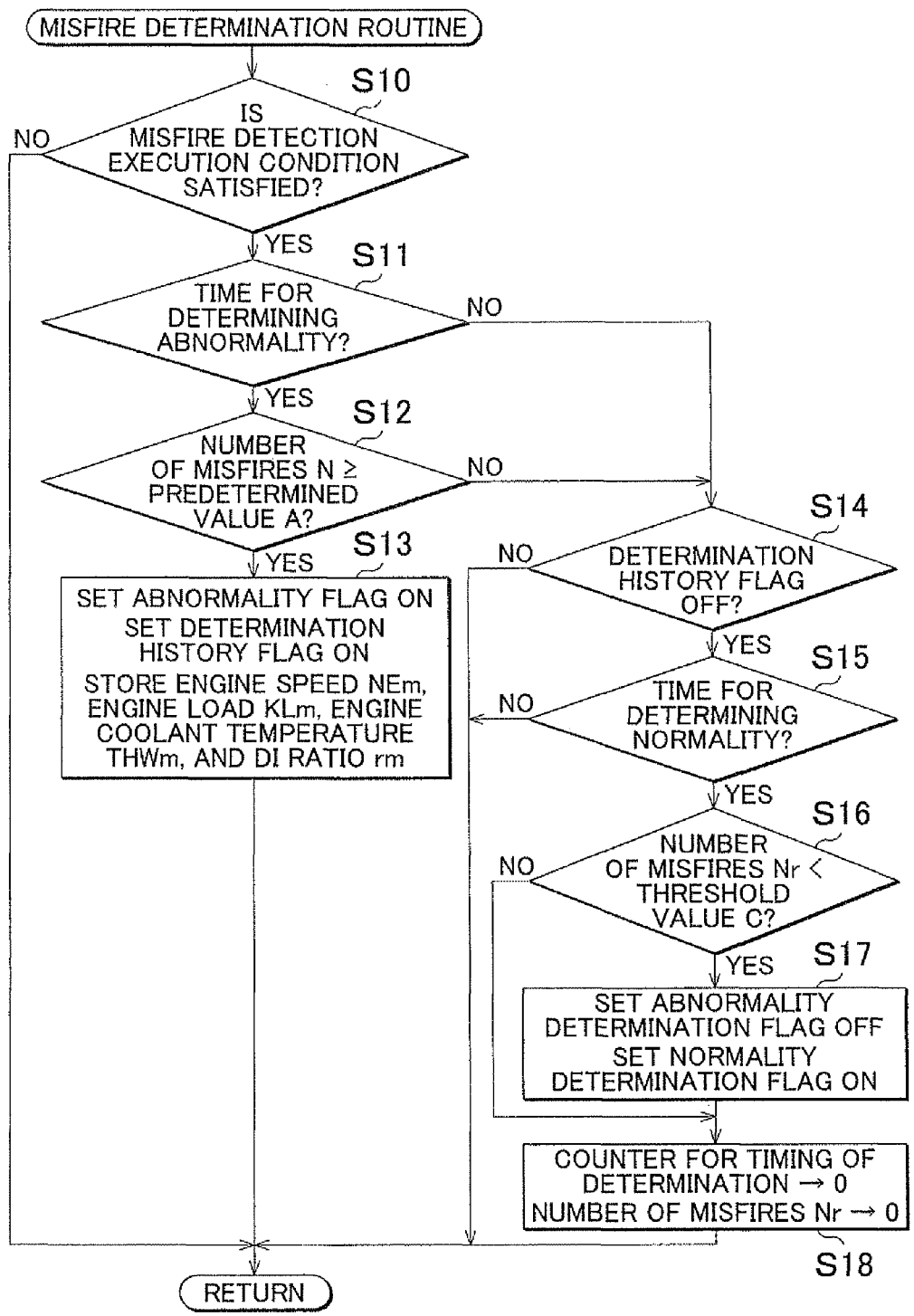

F I G. 13

| COUNTER STATUS | STORED CONTENT FOR EACH INJECTION PATTERN |
|---|---|
| $C1>0$<br>$C2=0$<br>$C3=0$ OR $C3>0$ | STORE THAT IN-CYLINDER INJECTION VALVE 15 IS ABNORMAL, STORE INFLUENCE OF IN-CYLINDER INJECTION VALVE 15 WHERE $C3>0$ |
| $C1=0$<br>$C2>0$<br>$C3=0$ OR $C3>0$ | STORE THAT PORT INJECTION VALVE 24 IS ABNORMAL, STORE INFLUENCE OF PORT INJECTION VALVE 24 WHERE $C3>0$ |
| $C1>0$<br>$C2>0$<br>$C3=0$ OR $C3>0$ | STORE NOTHING SINCE BOTH IN-CYLINDER INJECTION VALVE 15 AND PORT INJECTION VALVE 24 ARE ABNORMAL |
| $C1=0$<br>$C2=0$<br>$C3>0$ | STORE THAT ABNORMALITY OCCURS WHEN BOTH IN-CYLINDER INJECTION VALVE 15 AND PORT INJECTION VALVE 24 ARE USED |

ABNORMALITY DIAGNOSING SYSTEM FOR INTERNAL COMBUSTION ENGINE

INCORPORATION BY REFERENCE

The disclosure of Japanese Patent Application No. 2009-170195 filed on Jul. 21, 2009 including the specification, drawings and abstract is incorporated herein by reference in its entirety.

BACKGROUND OF THE INVENTION

1. Field of the Invention

The invention relates to an abnormality diagnosing system for an internal combustion engine including a first fuel injection valve for injecting fuel into a cylinder, a second fuel injection valve for injecting fuel into an intake passage, and a control device that controls an injection pattern of the first fuel injection valve and the second fuel injection value. The control device stores engine operating conditions, such as the engine speed, engine load and the engine coolant temperature, when an abnormality occurs in the internal combustion engine, and makes a return-to-normal determination as to whether the engine returns to a normal operating state, under engine operating conditions that are the same as or within predetermined ranges of the stored engine operating conditions.

2. Description of the Related Art

One type of internal combustion engine includes an intake passage fuel injector for injecting fuel into an intake passage, and an in-cylinder fuel injector for injecting fuel into a combustion chamber of each cylinder. The internal combustion engine of this type changes an injection ratio between the injection amount of the intake passage fuel injector and that of the in-cylinder fuel injector, according to engine operating conditions of the engine load and the engine speed (see, for example, Japanese Patent Application Publication No. 2006-258031 (JP-A-2006-258031)).

In some cases, the internal combustion engine of the above type is provided with an abnormality diagnosing system for detecting, for example, an abnormality in a fuel system, and determining whether the fuel system that has been determined as abnormal returns to a normal operating state. More specifically, the abnormality diagnosing system stores the engine speed, engine load and the water temperature as engine operating conditions acquired when an abnormality in the fuel system is detected, and determines whether the fuel system or the engine returns to a normal operating state only when similar engine operating conditions are established.

However, when three injection patterns, i.e., an injection pattern using only the intake passage fuel injector, an injection pattern using only the in-cylinder fuel injector, and an injection pattern using both of the intake passage fuel injector and the in-cylinder fuel injector, are selectively used under the same engine operating conditions, for example, an erroneous determination as to whether the engine or fuel system returns to a normal operating state may be made based on the above-described engine operating conditions. More specifically, when an abnormality occurs in the fuel system under certain engine operating conditions, in the injection pattern using only the intake passage fuel injector, it may be determined that the engine or fuel system returns to a normal operating state under the same engine operating conditions, in the injection pattern using only the in-cylinder fuel injector. In this case, even though the abnormality in the fuel system occurs due to the use of the intake passage fuel injector, a diagnosis of the abnormality is conducted when the engine operates in the injection pattern using only the in-cylinder fuel injector; therefore, the abnormality diagnosing system may erroneously determine that the engine or fuel system returns to a normal operating state, in other words, the system may re-evaluate the engine or fuel system as normal. Similarly, the problem as described above occurs in a diagnosis of an abnormality, such as misfiring, other than the diagnosis of the abnormality in the fuel system as described above.

SUMMARY OF THE INVENTION

The invention has been developed in view of the above situations, and provides an abnormality diagnosing system for an internal combustion engine including an intake passage fuel injector and an in-cylinder fuel injector, wherein, when an abnormality is detected in the internal combustion engine, the frequency of erroneously determining that the engine returns to a normal operating state is reduced.

According to one aspect of the invention, an abnormality diagnosing system for an internal combustion engine including a first fuel injection valve that injects fuel into a cylinder, and a second fuel injection valve that injects fuel into an intake passage, is provided which includes a control device that controls an injection pattern of the first fuel injection valve and the second fuel injection valve. The control system is configured to store engine operating conditions of an engine speed, an engine load and an engine coolant temperature when an abnormality occurs in the internal combustion engine, and make a return-to-normal determination as to whether the engine returns to a normal operating state when similar operation conditions that are the same as or within predetermined ranges of the stored engine operating conditions are established. The injection pattern is selected from a first pattern in which the fuel is injected solely from the first fuel injection valve, a second pattern in which the fuel is injected solely from the second fuel injection valve, and a third pattern in which the fuel is injected from both of the first fuel injection valve and the second fuel injection valve. The control device stores the injection pattern when the abnormality occurs, and makes a return-to-normal determination on condition that the engine is operating in an injection pattern that is the same as the stored injection pattern.

In the abnormality diagnosing system as described above, it is not determined that the engine returns to a normal operating state (in other words, the engine is not re-evaluated as normal) unless the injection pattern, as well as the engine operating conditions, is the same as that stored when the abnormality occurred. It is therefore possible to reduce the frequency of occasions where it is determined that the engine returns to a normal operating state even though the injection pattern is different from the stored injection pattern, which occasions would occur when the above determination is made only based on the engine operating conditions.

In the abnormality diagnosing system as described above, it is preferable that the control device controls an injection ratio as a ratio of an injection amount of the first fuel injection valve to a total amount of the injection amount of the first fuel injection valve and that of the second fuel injection valve, and that the control device is configured to store the injection ratio at the time when an abnormality occurs in the internal combustion engine, and makes a return-to-normal determination as to whether the engine returns to a normal operating state on condition that a similar injection ratio that is equal to or within a predetermined range of the stored injection ratio is established.

In the abnormality diagnosing system as described above, the control device does not make a return-to-normal determination as to whether the engine returns to a normal operating state unless the injection ratio, in addition to the engine operating conditions, is equal to or within the predetermined range of the injection ratio stored when the abnormality occurred. It is thus possible to avoid a problem that the engine is determined as returning to a normal operating state even though the injection pattern is different from that stored upon occurrence of the abnormality, which problem would occur when a return-to-normal determination is made only based on the engine operating conditions. Also, the frequency of erroneously determining that the engine returns to a normal operating state can be reduced by determining whether a more precise operating condition (i.e., the injection ratio) is the same as or within the predetermined range of the stored operating condition when the engine is in the third injection pattern.

In the abnormality diagnosing system as described above, where the abnormality in the internal combustion engine is occurrence of an excessive number of misfires, it is preferable that the control device determines at each first predetermined period whether the abnormality occurs in the internal combustion engine within the first predetermined period, and determines at each second predetermined period whether the abnormality occurs in the internal combustion engine within the second predetermined period that is different from the first predetermined period.

The occurrence of an excessive number of misfires causes two types of problems, i.e., deterioration of emissions and melting loss of an emission control device, in the internal combustion engine. If a determination on the abnormality is made at each first predetermined period, or at first intervals, the control device cannot determine which of the above two types of problems occurs. In this respect, the control device of the system of the invention makes determinations on the abnormality at each first predetermined period and at each second predetermined period different from the first predetermined period, thus making it possible to distinguish between the two types of problems.

In the abnormality diagnosing system as described above, where the abnormality in the internal combustion engine is occurrence of an excessive number of misfires, it is preferable that the control device has a first threshold value of the number of misfires based on which it is determined whether the abnormality occurs in the engine, and a second threshold value of the number of misfires based on which a return-to-normal determination as to whether the engine returns to a normal operating state is made, and that the second threshold value is smaller than the first threshold value.

In the abnormality diagnosing system as described above, the second threshold value is smaller than the first threshold value, which means that the condition under which a return-to-normal determination is made is more rigorous than the condition under which a determination on the abnormality is made (i.e., the abnormality is detected); therefore, the frequency of making erroneous return-to-normal determinations can be further reduced.

In the abnormality diagnosing system as described above, where the abnormality in the internal combustion engine is occurrence of an excessive number of misfires, it is preferable that the control device determines whether a currently detected air/fuel ratio is within a predetermined range, and, when the air/fuel ratio is within the predetermined range, the control device makes a return-to-normal determination while being inhibited from making a determination as to whether the similar injection ratio that is equal to or within the predetermined range of the stored injection ratio is established.

In the abnormality diagnosing system as described above, when the air/fuel ratio is within the predetermined range, the control device is inhibited from making a determination as to whether the similar injection ratio is established; therefore, the calculation load imposed on the control system due to calculation of the injection ratio can be reduced.

In the abnormality diagnosing system as described above, where the abnormality in the internal combustion engine is an abnormality in a fuel system, it is preferable that the control device determines that there is an abnormality in the fuel system when a fuel correction amount of the first fuel injection valve or a fuel correction amount of the second fuel injection valve is outside a first predetermined range set in advance for determining normality of the fuel system. When both of the fuel correction amount of the first fuel injection valve and the fuel correction amount of the second fuel injection valve are within the first predetermined range, the control device determines that the engine returns to a normal operating state under the similar operating conditions, on the conditions that the injection pattern is the same as that stored at the time of occurrence of the abnormality, and that both of the fuel correction amount of the first fuel injection valve and the fuel correction amount of the second fuel injection valve are within a second predetermined range that is narrower than the first predetermined range.

In the abnormality diagnosing system as described above, where the abnormality in the internal combustion engine is an abnormality in a fuel system, it is preferable that the control device determines that there is an abnormality in the fuel system when a fuel correction amount of the first fuel injection valve or a fuel correction amount of the second fuel injection valve is outside a first predetermined range set in advance for determining normality of the fuel system. When both of the fuel correction amount of the first fuel injection valve and the fuel correction amount of the second fuel injection valve are within the first predetermined range, the control device determines that the engine returns to a normal operating state under the similar operating conditions, on the conditions that the similar injection ratio that is equal to or within the predetermined range of the stored injection ratio is established, and that both of the fuel correction amount of the first injection valve and the correction amount of the second injection valve are within a second predetermined range that is narrower than the first predetermined range.

In the abnormality diagnosing system as described above, it is preferable that the control device variably set a range that defines the similar injection ratio, according to the injection ratio obtained when the abnormality in the fuel system is detected.

In the abnormality diagnosing system as described above, the predetermined range of the injection ratio as a condition for determining that the engine returns to a normal operating state is set to varying ranges, according to the injection ratio stored when the abnormality in the fuel system was detected. It is thus possible to set an appropriate range for determining that the engine returns to a normal operating state, in relation to the injection ratio obtained at the time of occurrence of the abnormality in the fuel system.

In the abnormality diagnosing system as described above, it is preferable that the control device has a counter for use in detection of an abnormality in the fuel system, with respect to each of the injection patterns.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6 is a flowchart illustrating a misfire determination routine executed by the abnormality diagnosing system of the first embodiment;

FIG. 13 is a table indicating an abnormality determination content for each injection pattern, for use in an abnormality diagnosing system of an internal combustion engine according to a further embodiment of the invention.

DETAILED DESCRIPTION OF EMBODIMENTS

Referring to FIG. 1-FIG. 6, an abnormality diagnosing system for an internal combustion engine of a vehicle according to a first embodiment of the invention, more specifically, an abnormality diagnosing system for diagnosing excessive occurrence of misfires in the vehicle engine, will be described.

Figure 1:
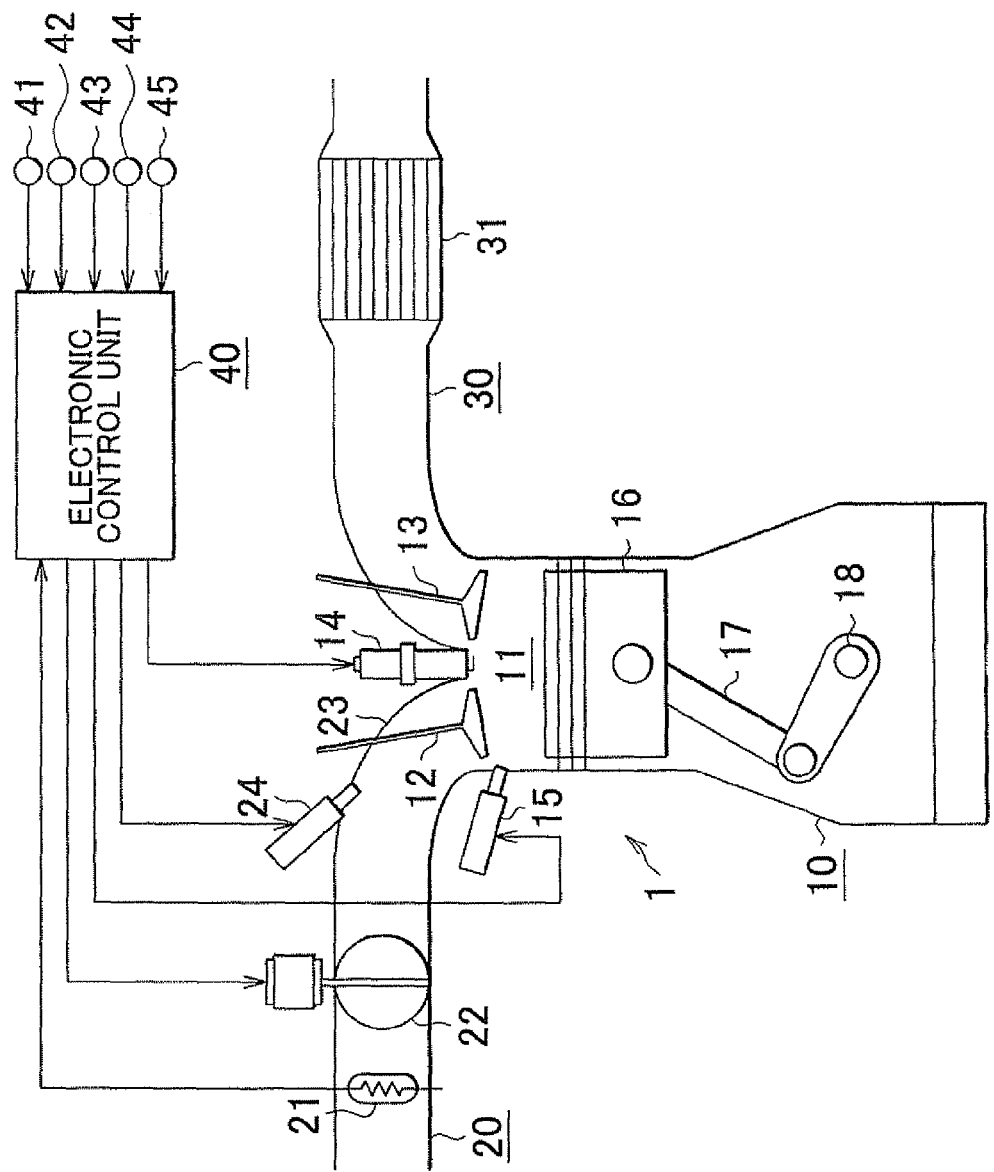
FIG. 1 is a view schematically showing the overall construction of an internal combustion engine having an abnormality diagnosing system according to a first embodiment of the invention.

As shown in FIG. 1, the engine 1 consists principally of an engine main body 10 in which a combustion chamber 11 is formed, and intake passage 20 and exhaust passage 30 that are connected to the engine main body 10 and communicate with the combustion chamber 11.

In the engine main body 10, intake valve 12 and exhaust valve 13 disposed at the intake side and exhaust side, respectively, of the combustion chamber 11, an ignition plug 14, and an in-cylinder fuel injection valve or injector 15 that injects fuel into the combustion chamber 11 are provided. Also in the engine main body 10, a cylinder 16 that forms a part of the combustion chamber 11, a connecting rod 17 coupled to the cylinder 16, and a crankshaft 18 coupled to the connecting rod 17 are provided.

An air flow meter 21 and a throttle valve 22 are provided in the intake passage 20 such that the air flow meter 21 is disposed upstream of the throttle valve 22 as viewed in the direction of flow of the intake air. The intake passage 20 has a port 23 that communicates with the combustion chamber 11, and a port fuel injection valve or injector 24 that injects fuel into the port 23 is mounted in the port 23. Also, an exhaust control device 31 for cleaning exhaust gas is provided in the exhaust passage 30.

In operation, an air-fuel mixture as a mixture of fuel injected from the port fuel injection valve 24 and in-cylinder fuel injection valve 15 and air drawn via the intake passage 20 is introduced into the combustion chamber 11. The air-fuel mixture is spark-ignited by the ignition plug 14 and burned, so that the cylinder 16 moves up and down. As a result, the crankshaft 18 rotates in accordance with the up-and-down movements of the cylinder 16. In this manner, the engine 1 produces power for running the vehicle.

An electronic control unit (ECU) 40 for engine control performs various controls of the engine 1 constructed as described above. The ECU 40 consists principally of CPU (central processing unit) that performs various operations or computations associated with engine control, ROM (read-only memory) in which programs and data for use in engine control are recorded, RAM (random access memory) in which computation results, or the like, of the CPU are temporarily stored, and I/O (input/output port) that supplies and receives signals to and from the outside of the ECU 40.

The input port of the ECU 40 receives signals of various sensors including the above-mentioned air flow meter 21, engine speed sensor 41 that detects the engine speed NE, accelerator pedal position sensor 42 that detects the amount AP of operation of the accelerator pedal, water temperature sensor 43 that measures the engine coolant temperature THW so as to determine whether the engine is in a cold state or a warm state, throttle position sensor 44 that detects the degree of opening of the throttle valve 22, and an air/fuel ratio sensor 45 for calculating the air/fuel ratio during operation of the engine.

The ECU 40 acquires engine operating conditions, such as the engine speed NE and the engine load KL, based on output signals of various sensors, and the like. The engine load KL is calculated based the amount AP of operation of the accelerator pedal, intake air amount obtained based on the throttle opening TA and the flow rate GA of air in the intake passage, and the engine speed NE. The ECU 40 generates command signals to various drive circuits connected to the output port, in accordance with the thus acquired engine operating conditions. The controls performed by the ECU 40 include, for example, throttle control for adjusting the opening of the throttle valve 22, fuel injection control for adjusting the fuel injection amount of each of the in-cylinder fuel injection valve 15 and the port fuel injection valve 24, and ignition timing control for adjusting the ignition timing of the ignition plug 14.

In the fuel injection control of this embodiment, the ECU 40 controls the fuel injection ratio (which will be called "DI ratio r") of the in-cylinder fuel injection valve 15 and the port fuel injection valve 24 so that the total amount of fuel injected from the in-cylinder fuel injection valve 16 and the port fuel injection valve 24 becomes equal to a desired or target injection amount. Here, the fuel injection ratio (DI ratio r) represents a ratio of the injection amount of the in-cylinder fuel injection valve 15 to the total amount or sum of the injection amount of the in-cylinder fuel injection valve 15 and the injection amount of the port fuel injection valve 24.

In this connection, the in-cylinder fuel injection valve 15 contributes to increase or improvement of the output performance of the engine, and the port fuel injection valve 24 contributes to the homogeneity of the air-fuel mixture. By controlling the respective injection amounts of these two types of fuel injection valves having different characteristics, based on the engine speed NE and the engine load KL, only homogeneous combustion takes place in the engine 1 when it is in normal operating conditions.

Figure 2:
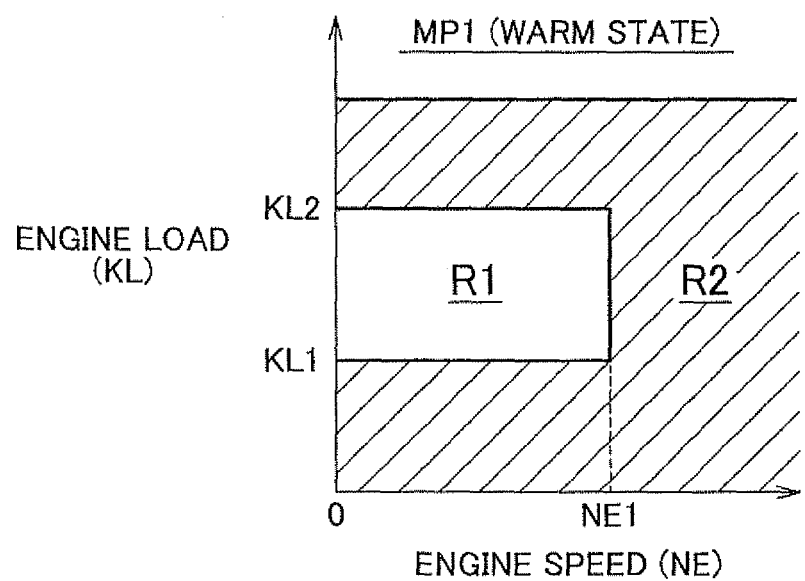
FIG. 2 is a graph for use in the abnormality diagnosing system of the first embodiment, showing regions for respective injection patterns of an in-cylinder fuel injection valve and a port fuel injection valve, in which the regions are set based on the engine load and the engine speed detected when the engine is in a warm state.
Figure 3:
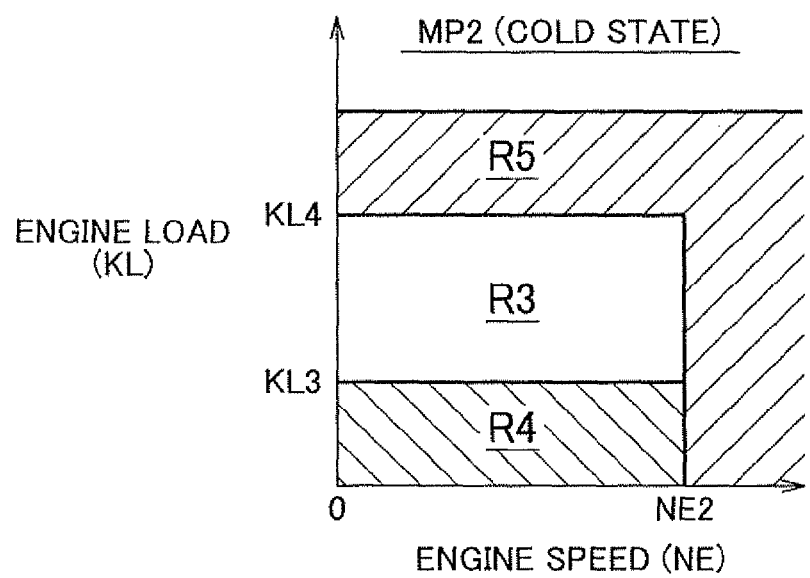
FIG. 3 is a graph for use in the abnormality diagnosing system of the first embodiment, showing regions for respective injection patterns of the in-cylinder fuel injection valve and the port fuel injection valve, in which the regions are set based on the engine load and the engine speed detected when the engine is in a cold state.

With regard to the DI ratio, maps as shown in FIG. 2 and FIG. 3 are prepared each of which shows operating regions set based on the DI ratio, with respect to the engine speed NE taken as the horizontal axis and the engine load KL taken as the vertical axis, under two conditions of the engine 1 where the engine 1 is in a warm state (FIG. 2) and where the engine is in a cold state (FIG. 3), respectively. When the engine coolant temperature THW is equal to or higher than a predetermined temperature threshold value (i.e., when the engine 1 is in a "warm state"), the map for warm state (which will be denoted as "map MP1") as shown in FIG. 2 is selected. When the engine coolant temperature THW is lower than the above-indicated temperature threshold value ("cold state") (i.e., when the engine 1 is in a "cold state"), the map for cold state (which will be denoted as "map MP2") as shown in FIG. 3 is selected. The fuel injection amounts of the in-cylinder fuel injection valve 15 and the port fuel injection valve 24 are respectively controlled based on these maps MP1, MP2.

In the maps MP1, MP2, the DI ratio r is set for each operating region set according to the engine speed NE and the engine load KL. The operating regions in the maps MP1, MP2 are classified into those of three injection patterns, i.e., "DI ratio r=100%", "0%<DI ratio r<100%", and "DI ratio r=0%". More specifically, in an operating region where the injection pattern is "DI ratio r=100%", fuel is injected solely from the in-cylinder fuel injection valve 15. In an operating region where the injection pattern is "DI ratio r=0%", fuel is injected solely from the port fuel injection valve 24. In an operating region where the injection pattern is "0%<DI ratio r<100%", the in-cylinder fuel injection valve 15 injects some portion of the fuel into the combustion chamber 11 while the port fuel injection valve 24 injects the remaining portion of the fuel.

As shown in FIG. 2, the map MP1 consists of an operating region R1 as the operating region of "0%<DI ratio r<100%", and an operating region R2 as the operating region of "DI ratio r=100%". The operating region R1 is formed by a region defined by vertical lines representing an engine speed NE equal to "0" and an engine speed NE equal to "NE1", and horizontal lines representing an engine load KL equal to "KL1" and an engine load KL equal to "KL2" that is higher than "KL1". The operating region R2 is formed as a region other than the operating region R1.

As shown in FIG. 3, the map MP2 consists of an operating region R3 as the operating region of "0%<DI ratio r<100%", operating region R4 as the operating region of "DI ratio r=0%", and an operating region R5 as the operating region of "DI ratio r=100%". The operating region R3 is formed by a region defined by vertical lines representing an engine speed NE equal to "0" and an engine speed NE equal to "NE2", and horizontal lines representing an engine load KL equal to "KL3" and an engine load KL equal to "KL4" that is higher than "KL3". The operating region R4 is formed by a region defined by vertical lines representing an engine speed NE equal to "0" and an engine speed NE equal to "NE2", and horizontal lines representing an engine load KL equal to "0" and an engine load KL equal to "KL3". The operating region R5 is formed as a region other than the operating region R3 and the operating region R4.

Specific numeral values of the DI ratio r in the "0%<DI ratio r<100%" regions as the operating regions R1, R3 in FIG. 2 and FIG. 3 are respectively calculated from the engine speed NE and the engine load KL in the maps MP1, MP2.

Figure 4:
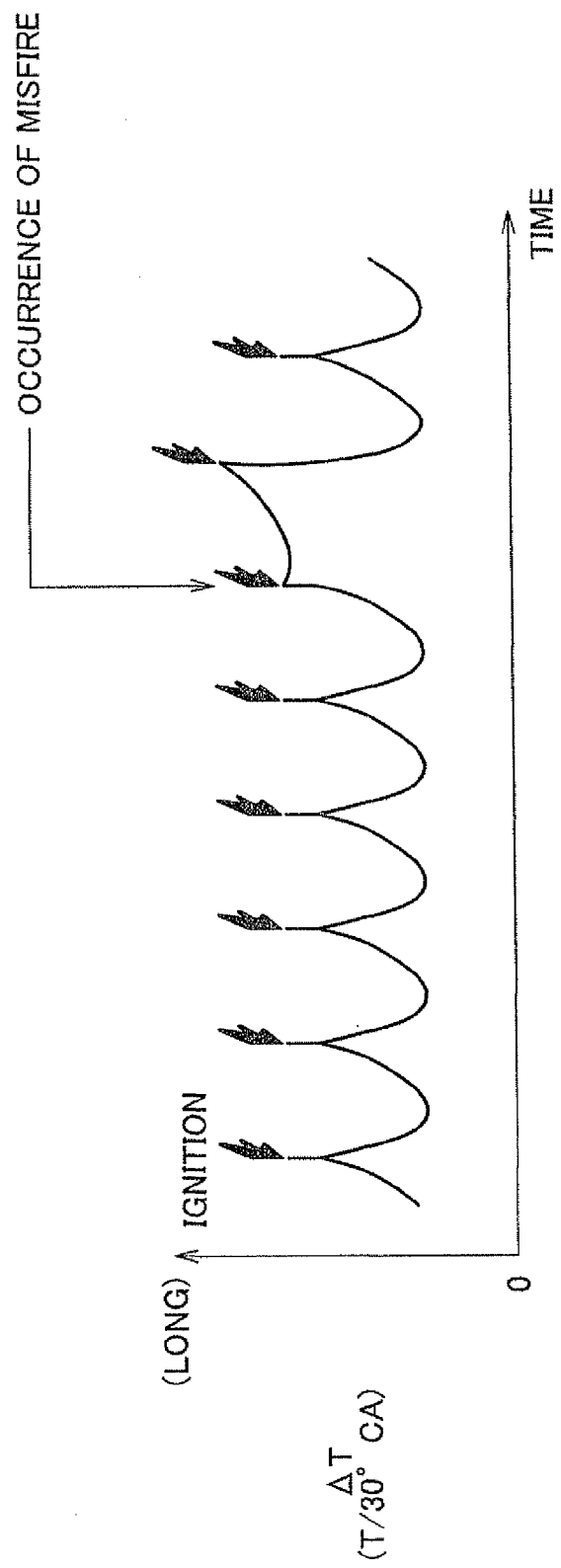
FIG. 4 is a time chart showing changes in the time required for the crankshaft to rotate by a given crank angle, for use in the abnormality diagnosing system of the first embodiment.
Figure 5A:
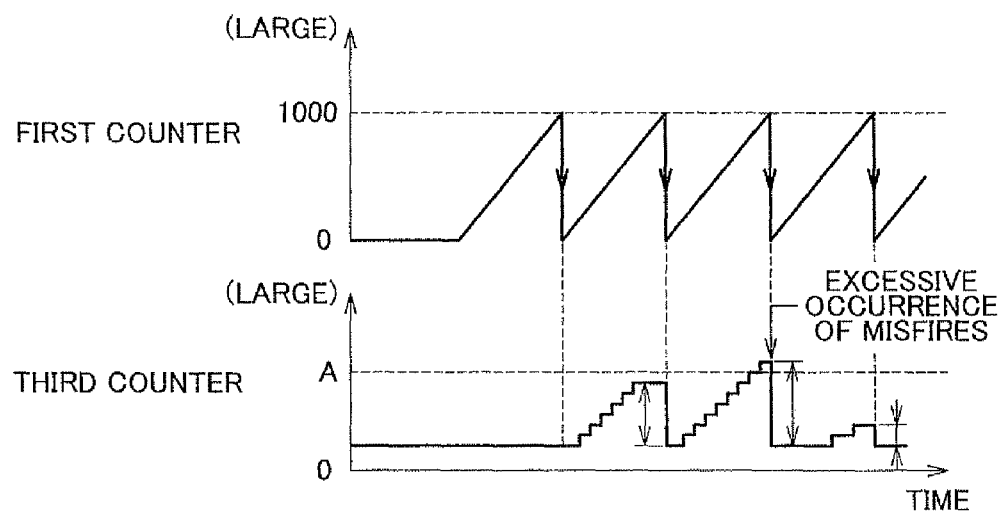
FIG. 5A is a time chart showing changes in the values of a first counter and a third counter based on which the abnormality diagnosing system of the first embodiment detects an abnormality associated with misfiring.
Figure 5B:
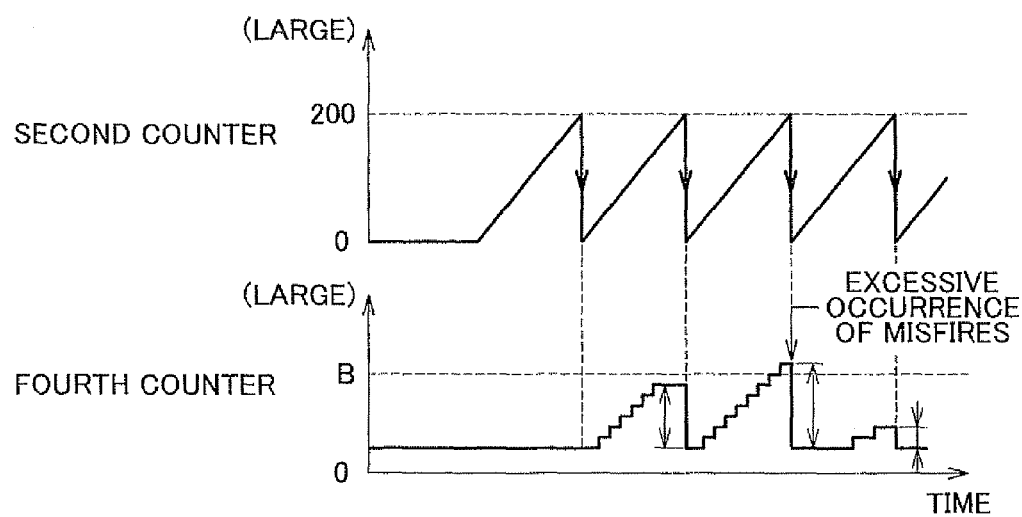
FIG. 5B is a time chart showing changes in the values of a second counter and a fourth counter based on which the abnormality diagnosing system of the first embodiment detects an abnormality associated with misfiring.

Referring next to FIG. 4, FIG. 5A and FIG. 5B, detection of excessive occurrence of misfires in the engine 1 and a method of detecting the same will be described. The ECU 40 measures a length of time $\Delta T$ (=T/30° CA) required for the crankshaft 18 to rotate by a given crank angle all the time, based on the engine speed sensor 41. It is to be noted that the time $\Delta T$ is inversely proportional to the rotational speed of the crankshaft 18.

As shown in FIG. 4, when the ignition plug 14 ignites or inflames the air-fuel mixture, the piston is rapidly pushed down due to explosion of the air-fuel mixture, so that the rotation of the crankshaft 18 is accelerated for a moment. Then, the acceleration gradually decreases due to pumping losses, friction losses, and so forth, and turns to deceleration at a certain point in time. Thereafter, the speed of rotation of the crankshaft 18 is gradually reduced until the next ignition takes place. Thus, the time $\Delta T$ is reduced each time ignition takes place, and repeatedly and periodically increases and decreases with substantially the same amplitude.

If a misfire occurs, the air-fuel mixture fails to explode, and the rotation of the crankshaft 18 is not accelerated. As a result, the above-indicated time $\Delta T$ continues to increase even after the ignition. Namely, if a misfire occurs, the rotational speed of the crankshaft 18 is not increased even after the ignition, but continues to be reduced. It is thus possible to detect occurrence of misfiring by monitoring variations in the time $\Delta T$. Accordingly, the ECU 40 monitors the misfiring state of the engine 1 all the time, and detects excessive occurrence of misfires from the frequency of occurrence of misfires.

The ECU 40 includes four counters, more specifically, first counter and second counter for counting the cumulative number of rotations of the crankshaft 18, and third counter and fourth counter for counting the number of misfires. The ECU 40 increases the value of each of the first counter and second counter by "1" each time one rotation of the crankshaft 18 is recognized from the output signal of the engine speed sensor 41 (see FIG. 5A and FIG. 5B). The ECU 40 resets the value of the first counter to "0" at the time when the counter value reaches "1000". Also, the ECU 40 resets the value of the second counter to "0" at the time when the counter value reaches "200". The ECU 40 repeatedly performs the above-described control from start of the engine 1. In the following description, a period of time in which the value of the first counter increases from "0" to "1000" will be referred to as "first predetermined period".

Along with the above-described operations of the first counter and the second counter, the ECU 40 increases the value of each of the third counter and fourth counter by "1" each time occurrence of a misfire is recognized (i.e., a misfire is detected) based on the above-mentioned time ΔT (see FIG. 5A and FIG. 5B). The third counter indicates the cumulative number of misfires that occur during the period in which the value of the first counter increases from "0" to "1000", and the fourth counter indicates, the cumulative number of misfires that occur during a period of time in which the value of the second counter increases from "0" to "200". In the following description, the period of time in which the value of the second counter increases from "0" to "200" will be referred to as "second predetermined period".

The ECU 40 detects excessive occurrence of misfires on the conditions that the values of the third counter and fourth counter exceed a predetermined value A and a predetermined value B, respectively, as preset threshold values (first threshold values). If the ECU 40 detects excessive occurrence of misfires, namely, if the ECU 40 determines that an abnormality in terms of misfiring occurs in the engine 1, the ECU 40 stores the engine speed NEm, engine load KLm, engine coolant temperature THW (warm state or cold state), and the DI ratio rm as engine operating conditions acquired at this time, as historical information.

Also, the ECU 40 makes a return-to-normal determination (i.e., determines whether the engine 1 returns to a normal operating state), under the same engine operating conditions as the engine operating conditions (NEm, KLm, THWm, rm) of the historical information, and engine operating conditions involving errors within given ranges relative to those of the historical information. Here, the engine operating conditions involving errors within the given ranges are set as, for example, NEm±a, KLm±b, rm±x (where a, b, x are preset constants), and THWm (warm state or cold state). In the following description, the same engine operating conditions as those (NEm, KLm, THWm, rm) of the historical information, and engine operating conditions involving errors within given ranges relative to those of the historical information, will be generally called "similar operating conditions".

The ECU 40 further includes a fifth counter for counting the cumulative number of rotations of the crankshaft 18 under the similar operating conditions, and a sixth counter for counting the number of misfires under the similar operating conditions. The fifth counter counts the cumulative number in the same manner as the first counter, and the sixth counter counts the number of misfires in the same manner as the third counter.

To make a return-to-normal determination, the ECU 40 initially determines whether, under the similar operating conditions, the value of the sixth counter (i.e., the number Nr of misfires) is equal to or larger than a threshold value C that is smaller than the predetermined value A, during a period in which the value of the fifth counter increases from "0" to "1000". If the value of the sixth counter is smaller than the threshold value C (second threshold value), the ECU 40 detects no excessive occurrence of misfires, and determines that the engine 1 is normal in terms of misfiring. As a result, the ECU 40 changes the determination made on the historical information from an abnormality determination (that the engine 1 is abnormal in terms of misfiring) to a normality determination (that the engine 1 is normal in terms of misfiring). If the value of the fifth counter is equal to or larger than the threshold value C, the ECU 40 detects excessive occurrence of misfires, and maintains the above determination that the engine 1 is abnormal in terms of misfiring.

As described above, the ECU 40 monitors a misfiring state during operation of the engine 1 all the time. Then, the ECU 40 determines normality/abnormality in terms of misfiring, based on the result of monitoring, and turns on a warning lamp if it detects an abnormality.

Figure 7:
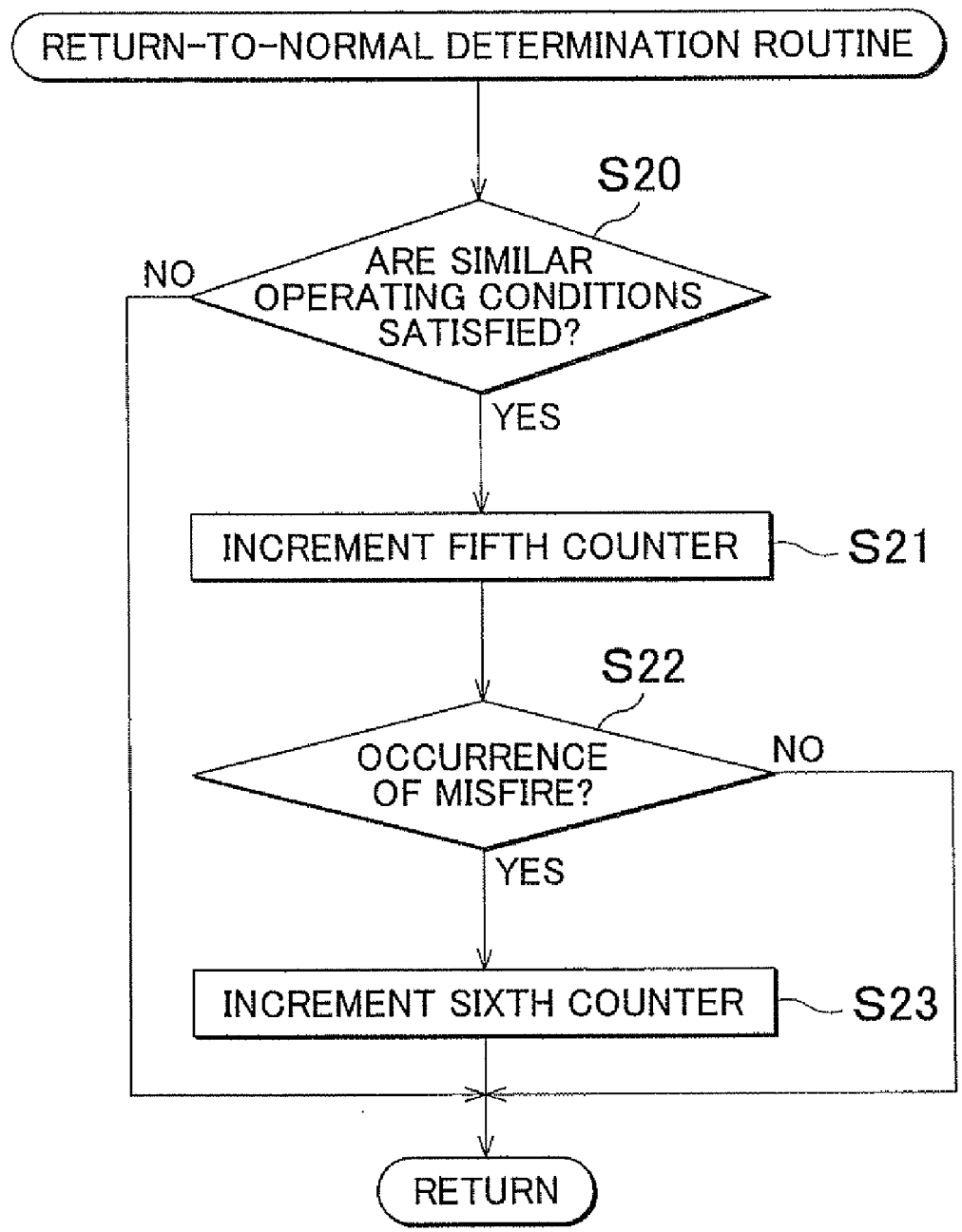
FIG. 7 is a flowchart illustrating a misfire calculation routine executed by the abnormality diagnosing system of the first embodiment.

Referring next to FIG. 6 and FIG. 7, a process (misfiring determination routine) in which the ECU 40 makes a determination on excessive occurrence of misfires and makes a return-to-normal determination will be described in detail. In this process, a determination on excessive occurrence of misfires and a return-to-normal determination are made at given time intervals, as shown in FIG. 6, and the number of misfires that occur under the above-mentioned similar operating conditions is calculated as shown in FIG. 7 each time the crankshaft 18 rotates by a given angle. Then, a return-to-normal determination concerning excessive occurrence of misfires is made based on the number of misfires calculated in the routine of FIG. 7. Since detection of misfires using the first counter is similar to that using the second counter, detection of misfires is supposed to be conducted based on the first counter in the routine of FIG. 6 as described below, and no explanation will be provided with respect to the second counter.

In step S10, it is determined whether a misfire detection execution condition is satisfied. The misfire detection execution condition includes, for example, (a) a predetermined time has elapsed from start of the engine 1, (b) the engine 1 is not under fuel-cut control, and (c) the engine coolant temperature THW is equal to or higher than a predetermined temperature. If all of these conditions (a)-(c) are satisfied, it is determined that the misfire detection execution condition is satisfied (YES in step S10). Then, it is determined in step S11 whether it is the time for making a determination on the presence of an abnormality. The time for making a determination on the presence of an abnormality is a point in time at which the value of the first counter reaches "1000". If, on the other hand, any of the above conditions (a)-(c) is not satisfied, namely, if the misfire detection execution condition is not satisfied (NO in step S10), the current cycle of the routine of FIG. 6 ends.

If the time for making a determination on the presence of an abnormality is reached (YES in step S11), it is determined in step S12 whether the number of misfires N counted by the third counter at this time is equal to or larger than the predetermined value A. If the number of misfires N is equal to or larger than the predetermined value A (YES in step S12), it is determined that an excessive number of misfires occur in the engine 1. Then, in step S13, an abnormality flag and a determination history flag are set to ON, and the engine speed NEm, engine load KLm, engine coolant temperature THWm and the DI ratio rm as the engine operating conditions obtained at this time are stored.

On the other hand, when it is not the time for making a determination on the presence of an abnormality (NO in step S11), and when the number of misfires N is smaller than the predetermined value A (NO in step S12), it is determined in step S14 whether the determination history flag is in the OFF state. If the determination history flag is in the OFF state (YES in step S14), it is determined that no abnormality determination has been made during this trip, and a return-to-normal determination as described below is made. If, on the other hand, the determination history flag is in the ON state (NO in step S14), an abnormality determination has been made (i.e., an abnormality has been detected) during this trip, and the current cycle of the routine ends.

In the return-to-normal determination process, it is determined in step S20 of the misfire calculation routine as shown in FIG. 7 whether the similar operating conditions are satisfied. If the similar operating conditions are satisfied (YES in step S20), the fifth counter as a counter for determining the time for making a determination whether the engine 1 is normal in terms of misfiring is incremented (namely, the fifth counter is increased by "1" for each cycle) in step S21, during the period in which the similar operating conditions are satisfied. Then, it is determined in step S22 whether a misfire occurs under the similar operating conditions. If a misfire occurs (YES in step S22), the sixth counter for counting the number of misfires Nr under the similar operating conditions is incremented (namely, the sixth counter is increased by "1" for each cycle) in step 23. On the other hand, when the similar operating conditions are not satisfied (NO in step 20), and when no misfire occurs under the similar operating conditions (NO in step S22), the current cycle of the routine of FIG. 7 ends.

Subsequently, it is determined in step S15 whether the fifth counter is equal to "1000". If the fifth counter is "1000" (YES in step S15), it is determined in step S16 whether the number of misfires Nr counted by the sixth counter is smaller than the threshold value C. If the number of misfires Nr is smaller than the threshold value C (YES in step S16), it is determined that there is no excessive occurrence of misfires under the similar operating conditions. Then, in step S17, the abnormality determination flag is set to the OFF state, and a normality determination flag is set to the ON state (namely, the abnormality determination made under the similar operating conditions is cancelled, and a normality determination, i.e., a determination that the engine 1 is normal in terms of misfiring, is made under the similar operating conditions). If the sixth counter is equal to or larger than the threshold value C (NO in step S16), it is determined that an excessive number of misfires occur under the similar operating conditions, and the abnormality determination flag is kept in the ON state. After a normality determination or an abnormality determination is made in the above manner, the values of the fifth counter and the sixth counter are reset to "0" in step S18, and the current cycle of the routine of FIG. 6 ends. On the other hand, if the fifth counter is not equal to "1000" (NO in step S15), the current cycle of the routine ends.

According to the process as described above, the engine operating conditions under which excessive occurrence of misfires is detected are stored, and it is determined in subsequent cycles that there was no excessive occurrence of misfires under these engine operating conditions if no excessive occurrence of misfires is detected under the same or similar operating conditions as these engine operating conditions.

If the engine operating conditions stored when excessive occurrence of misfires is detected are only those of the engine speed NE, engine load KL and the engine coolant temperature THW, a return-to-normal determination may be erroneously made. More specifically, if the DI ratio is equal to 100% (DI ratio=100%) when excessive occurrence of misfires is detected, whereas the DI ratio is equal to 0% (DI ratio=0%) when a return-to-normal determination is made under the same or similar operating conditions, it may be erroneously determined, due to the use of different types of fuel injection valves, that the engine 1 operates normally even though an excessive number of misfires depending on the fuel injection valve in use occur. Described in greater detail, even though an excessive number of misfires occur due to the use of the in-cylinder fuel injection valve 15, it is erroneously determined that the engine 1 is normal in terms of misfiring, since it is determined in the return-to-normal determination process whether an excessive number of misfires occur in the engine 1 where the port fuel injection valve 24 is used.

In this embodiment, therefore, the engine operating conditions stored when excessive occurrence of misfires is detected include the DI ratio rm, and the similar operating conditions also include the DI ratio r, so that no return-to-normal determination is made unless the injection pattern of the fuel injection valve(s) (i.e., the in-cylinder fuel injection valve and/or the port fuel injection valve) used and the injection ratio in this injection pattern are the same as or similar to those represented by the DI ratio r as one of the similar operating conditions. Accordingly, the ECU is less likely or unlikely to make an erroneous return-to-normal determination.

According to this embodiment, the following effects are provided. (1) In this embodiment, the similar engine operating conditions used for making a return-to-normal determination include the DI ratio r, in addition to the engine speed NE, engine load KL and the engine coolant temperature THW. It is thus possible to avoid a problem that the engine 1 is erroneously determined as normal even though the DI ratio is different from that of the similar operating conditions, which problem would be encountered in the case where a return-to-normal determination is made under only the engine operating conditions of NE, KL and THW.

(2) In this embodiment, the first counter and the second counter are provided as counters for making a determination on the presence of an abnormality, and the first counter and second counter are arranged to count different cumulative numbers of rotations. With this arrangement, two types of determinations about deterioration of emissions and melting loss of an emission control device, as problems of the internal combustion engine resulting from excessive occurrence of misfires, can be made.

(3) In this embodiment, the threshold value C used for making a return-to-normal determination is set to a smaller value than the threshold value A used for determining the occurrence of an abnormality. Thus, the condition under which it is determined that the engine 1 returns to a normal operating state is more rigorous than the condition under which an abnormality is detected; therefore, the frequency or possibility of making erroneous return-to-normal determinations can be reduced.

Figure 8:
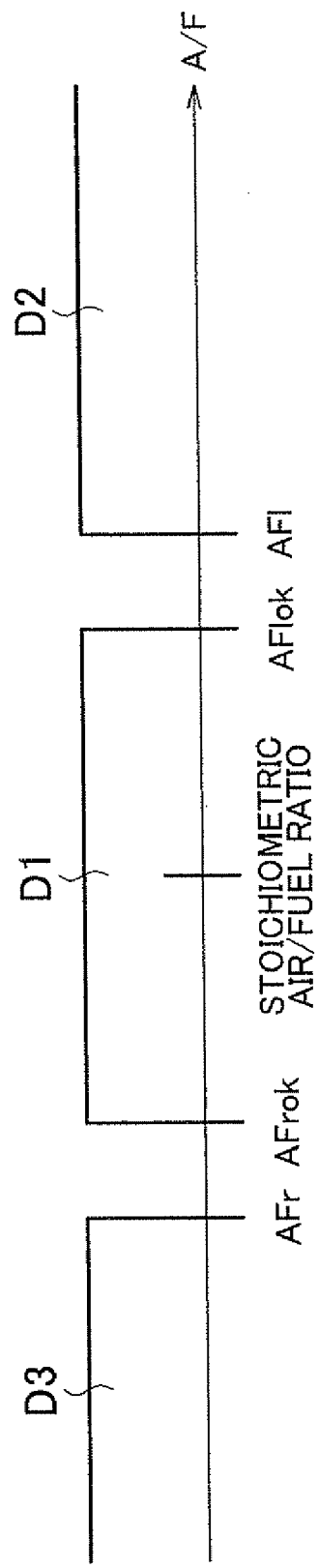
FIG. 8 is a graph useful for determining whether the air/fuel ratio is in a normal range or in an abnormal range, in an abnormality diagnosing system of an internal combustion engine according to a second embodiment of the invention.
Figure 9:
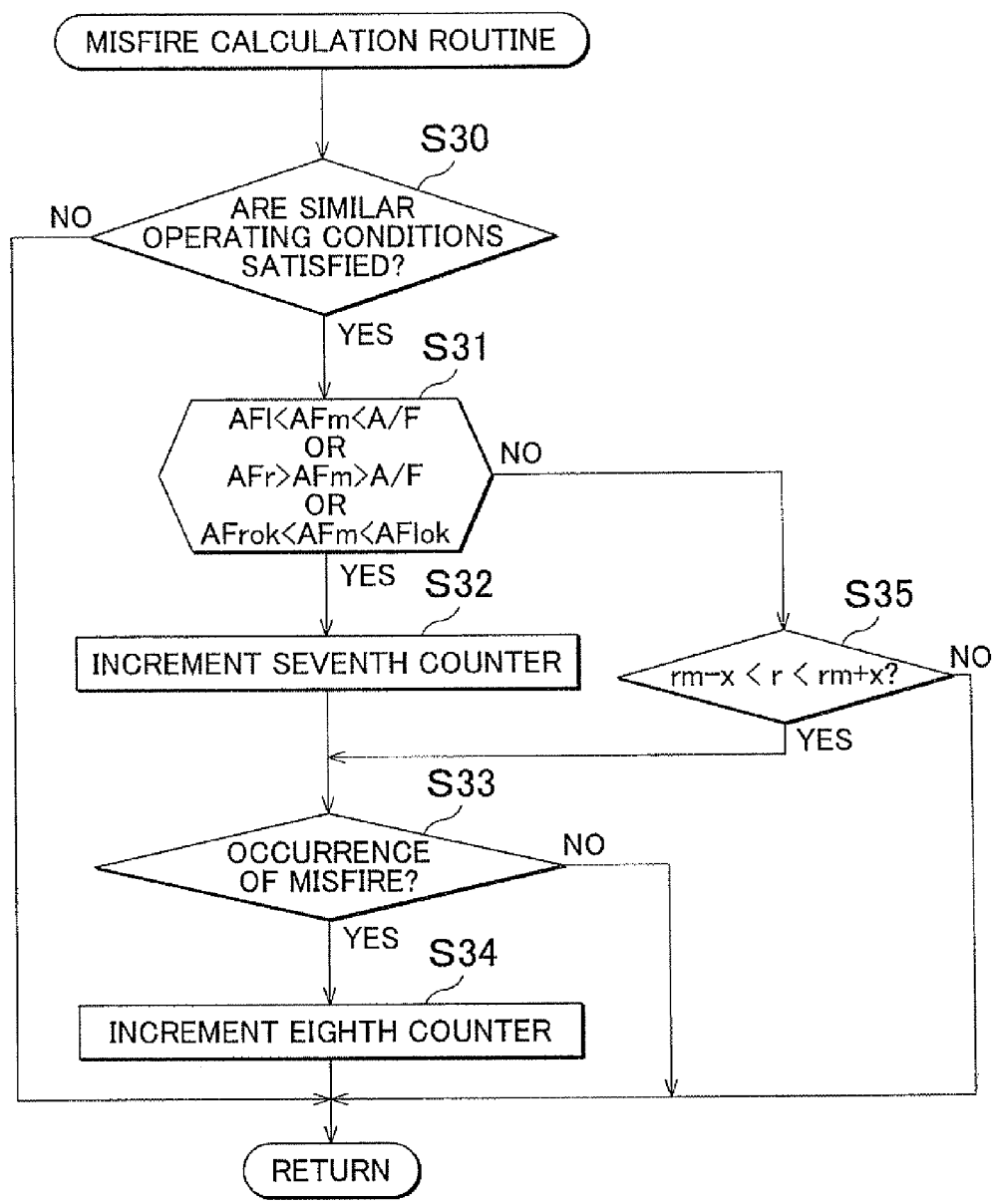
FIG. 9 is a flowchart illustrating a misfire calculation routine executed in the abnormality diagnosing system of the second embodiment.

Referring to FIG. 8 and FIG. 9, an abnormality diagnosing system of an internal combustion engine of a vehicle according to a second embodiment of the invention, more specifically, an abnormality diagnosing system for diagnosing a misfiring abnormality in the vehicle engine, will be described. In this embodiment, a method of setting similar operating conditions is different from that of the first embodiment as described below.

Namely, as one of the same or similar operating conditions, a selection as to whether it is determined whether the DI ratio r is within a given range is made, using the air/fuel ratio A/F. More specifically, as an engine operating condition at the time when it is determined that an excessive number of misfires occur (i.e., when an abnormality determination is made), the air/fuel ratio AFm at this time is stored. Then, it is determined which of a normality determination region D1, a lean region D2 and a rich region D3 as shown in FIG. 8 the above-indicated air-fuel ratio AFm belongs to, and the above selection is made by comparing the air/fuel ratio A/F detected when the similar operating conditions (other than the DI ratio r) are satisfied, with the above-indicated air/fuel ratio AFm.

In FIG. 8, the normality determination region D1 is defined as a range from a rich normality determination value AFrok as a given threshold value of a difference from the stoichiometric air/fuel ratio, to a lean normality determination value AFlok as a given threshold value of a difference from the stoichiometric air/fuel ratio. The lean region D2 is defined as a range that is leaner than a lean determination value AFl as a threshold value that is leaner than the lean normality determination value AFlok. Also, the rich region D3 is defined as a range that is richer than a rich determination value AFr as a threshold value that is richer than the rich normality determination value AFrok. The rich normality determination value AFrok, lean normality determination value AFlok, rich determination value AFr and the lean determination value AFl are set in advance by experiment, or the like.

In the meantime, the above-indicated air/fuel ratio AFm may fall in one of the three regions, i.e., the normality determination region D1, lean region D2 and the rich region D3. A method of setting the similar operating conditions will be described with respect to the case where the air/fuel ratio AFm is in each of the above three regions.

(A) In the case where the air/fuel ratio AFm is in the normality determination region D1, it is determined that excessive occurrence of misfires is not caused by the in-cylinder fuel injection valve 15 and the port fuel injection valve 24. Therefore, even if it is determined that the engine 1 returns to a normal operating state, without taking account of the DI ratio r, it will not be a wrong determination since there is no abnormality in the in-cylinder fuel injection valve 15 and the port fuel injection valve 24. Accordingly, only the engine speed NEm, engine load KLm and the engine coolant temperature THWm are set as the similar operating conditions.

(B) In the case where the air/fuel ratio AFm is in the lean region D2, the DI ratio r is not included in the similar operating conditions, on the condition that the currently detected air/fuel ratio A/F is leaner than the air/fuel ratio AFm. Accordingly, only the engine speed NEm, engine load KLm and the engine coolant temperature THWm are set as the similar operating conditions. On the other hand, if the currently detected air/fuel ratio A/F is richer than the air/fuel ratio AFm, the DI ratio r is included in the similar operating conditions. Accordingly, the engine speed NEm, engine load KLm, engine coolant temperature THWm, and the DI ratio rm are set as the similar operating conditions.

(C) In the case where the air/fuel ratio AFm is in the rich region D3, the DI ratio r is not included in the similar operating conditions, on the condition that the currently detected air/fuel ratio A/F is richer than the air/fuel ratio AFm. Accordingly, only the engine speed NEm, engine load KLm and the engine coolant temperature THWm are set as the similar operating conditions. On the other hand, if the currently detected air/fuel ratio A/F is leaner than the air/fuel ratio AFm, the DI ratio is included in the similar operating conditions. Accordingly, the engine speed NEm, engine load KLm, engine coolant temperature THWm and the DI ratio rm are set as the similar operating conditions. By using the air/fuel ratio AFm in the manner as described above, the frequency of using the DI ratio r as a similar operating condition is reduced.

Referring next to FIG. 9, a misfiring determination process of this embodiment will be described in detail. This process is different from the misfiring determination process and misfire calculation process of the first embodiment only in the method of setting the similar operating conditions; therefore, the same steps or parts of the flowcharts will not be explained.

In the misfire calculation routine of FIG. 9, it is determined in step S30 whether the similar operating conditions other than the DI ratio r are satisfied. More specifically, it is determined whether the engine speed NE and the engine load KL detected at this time are within the ranges of NEm±a and KLm±b, respectively, and the currently detected engine coolant temperature THW is in the same state (warm state or cold state) as the stored engine coolant temperature THWm. If the similar operating conditions are satisfied (YES in step S30), it is determined in step S31 whether the above-indicated air/fuel ratio AFm or the air/fuel ratio A/F satisfies any of the following three conditions. Namely, if the air/fuel ratio AFm is leaner than the lean determination value AFl, it is determined whether the currently detected A/F ratio A/F is leaner than the air/fuel ratio AFm. If the air/fuel ratio AFm is richer than the rich determination value AFr, it is determined whether the currently detected air/fuel ratio A/F is richer than the air/fuel ratio AFm. If neither of the above-described two cases applies, it is determined whether the above-indicated air/fuel ratio AFm is in the range from the rich normality determination value AFrok to the lean normality determination value AFlok. If the air/fuel ratio AFm and the current air/fuel ratio A/F satisfy any of the above conditions (YES in step S31), a seventh counter is incremented in step S32, without determining whether the DI ratio r is equal to the stored DI ratio rm or within a given range (rm±x) of the DI ratio rm. In subsequent steps S32-S34, the same operations as those of steps S21-S23 of the first embodiment are performed.

On the other hand, if the air/fuel ratio AFm and the current air/fuel ratio A/F do not satisfy any of the above-described conditions (NO in step S31), it is determined in step S35 whether the DI ratio r is the same or in a similar range. More specifically, it is determined whether the DI ratio r is equal to the DI ratio rm or within the given range rm±x of the DI ratio rm. If the DI ratio is within the range of rm±x, step S33 is executed.

When the similar operating conditions are not satisfied (NO in step S30), and when the DI ratio r is not equal to the DI ratio rm nor within the given range rm±x (NO in step S35), the current cycle of the routine ends. In the process as described above, a determination as to whether the DI ratio r is evaluated as one of the similar operating conditions is made based on the air/fuel ratio, whereby the frequency of evaluating the DI ratio r is reduced.

According to this embodiment, the following effect (4) is provided in addition to the above-described effects (1)-(3) of the first embodiment. (4) In this embodiment, the system is configured to inhibit the DI ratio r from being evaluated as one of the similar operating conditions, when the air/fuel ratio A/F satisfies any of the above-described three conditions. Accordingly, the frequency of evaluating the DI ratio r is reduced, resulting in reduction of a calculation load on the ECU 40 when it calculates or evaluates the DI ratio. In particular, the air/fuel ratio A/F is also used for other functions, such as adjustment of the injection amount of each of the in-cylinder fuel injection valve 15 and the port fuel injection valve 24. Therefore, there is no need to use an exclusive determination value for inhibiting evaluation of the DI ratio r under the similar operating conditions; thus, the calculation load on the ECU 40 can be reduced.

Figure 10:
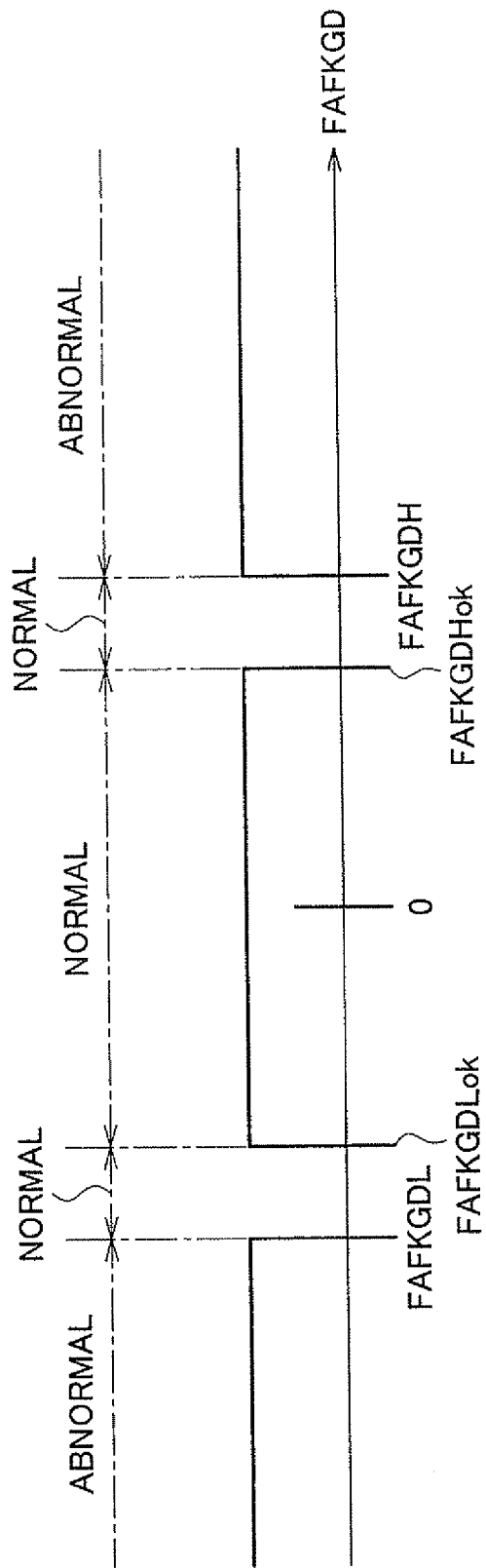
FIG. 10 is a graph useful for determining whether a fuel system is in a normal condition or an abnormal condition, in an abnormality diagnosing system of an internal combustion engine according to a third embodiment of the invention.
Figure 11:
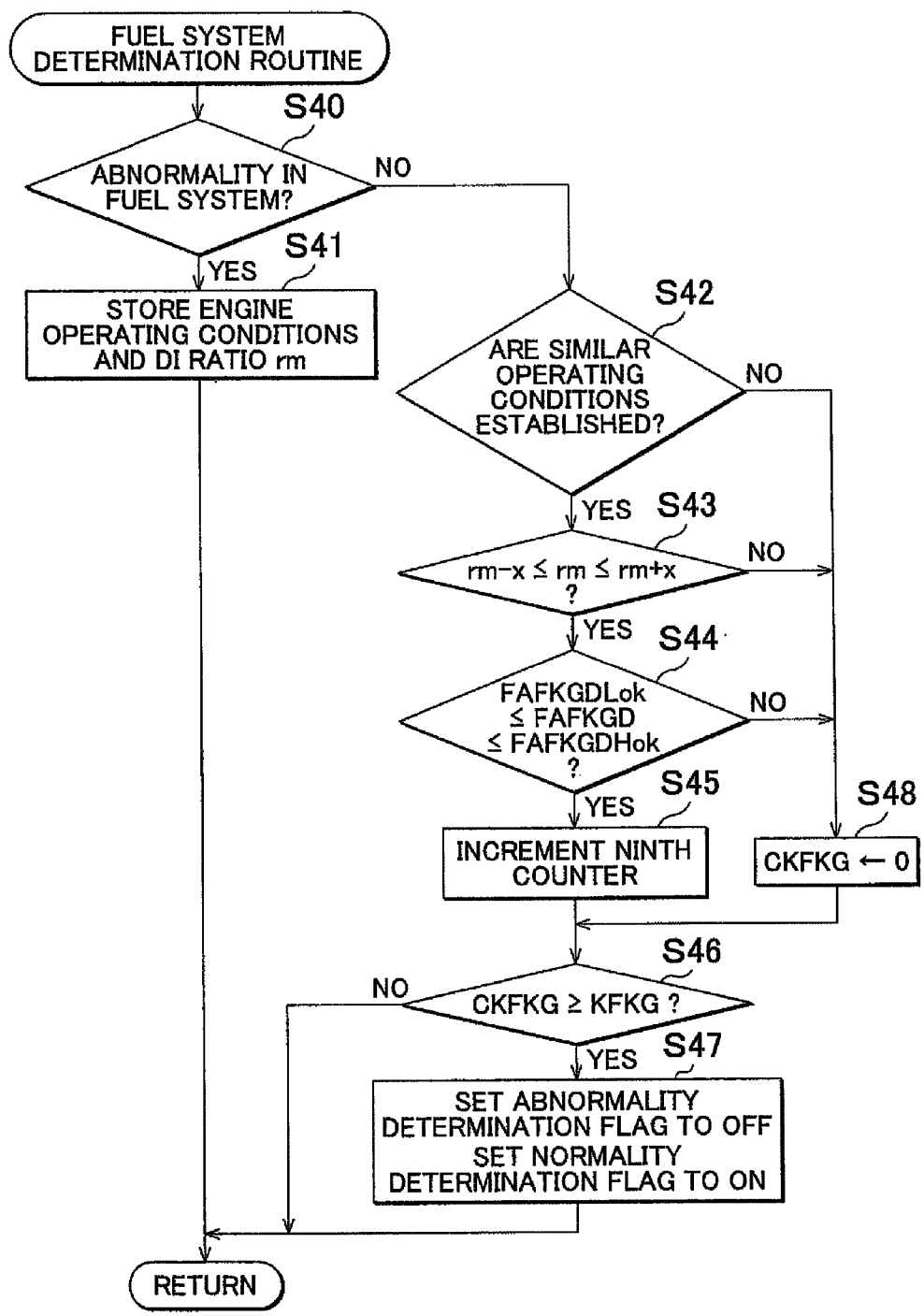
FIG. 11 is a flowchart illustrating a fuel-system normality/abnormality determination routine executed by the abnormality diagnosing system of the third embodiment.

Referring to FIG. 10 and FIG. 11, an abnormality diagnosing system of an internal combustion engine of a vehicle according to a third embodiment of the invention, more specifically, an abnormality diagnosing system for diagnosing an abnormality in a fuel system of the vehicle engine will be described.

In this embodiment, an abnormality in the fuel system is specified as the case where the fuel correction amount of the in-cylinder fuel injection valve 15 or the port fuel injection valve 24 is outside a predetermined range (first predetermined range) as a normal range of the fuel correction amount. Namely, when the fuel correction amount of the in-cylinder fuel injection valve 15 or the port fuel injection valve 24 is excessively large (rich abnormality) or the fuel correction amount is excessively small (lean abnormality), this situation is determined as an abnormality in the fuel system. The above-indicated predetermined range of the fuel correction amount is set in advance by experiment, or the like.

More specifically, as shown in FIG. 10, the ECU 40 determines which of the normal range, a lean-abnormality range and a rich-abnormality range the fuel correction amount FAFKGD detected at this time falls in. In FIG. 10, a range from a rich determination value FAFKGDH as a given threshold value to a lean determination value FAFKGDL as a given threshold value is defined as the normal range (first predetermined range) in which the fuel correction amount FAFKGD is normal. Also, a range from a rich normality determination value FAFKGDHok as a threshold value that is leaner than the rich determination value FAFKGDH to a lean normality determination value FAFKGDLok as a threshold value that is richer than the lean determination value FAFKGDL is defined as a return-to-normal range (second predetermined range) of the fuel correction amount FAFKGD in which it is determined that the fuel system returns to a normal operating state. Also, a range that is richer than the rich determination value FAFKGDH is defined as a rich abnormality range, and a range that is leaner than the lean determination value FAFKGDL is defined as a lean abnormality range. Also, the rich normality determination value FAFKGDHok, lean normality determination value FAFKGDLok, rich determination value FAFKGDH and the lean determination value FAFKGDL are set in advance by experiment, or the like.

When the fuel correction amount FAFKGD is in the lean abnormality range or in the rich abnormality range, the ECU 40 stores the currently detected engine operating conditions (i.e., the engine speed NEm, engine load KLm and the engine coolant temperature THWm) and the DI ratio rm.

On the other hand, when the fuel correction amount FAFKGD is in the first predetermined range, the ECU 40 increments a ninth counter for determining whether the fuel system is normal, on the conditions that (a) the engine operating conditions are the same as or within predetermined ranges of the engine operating conditions established when an abnormality in the fuel system is detected (i.e., similar operating conditions are established), (b) the DI ratio r is the same as or within a predetermined range of the DI ratio rm detected when an abnormality in the fuel system is detected, and (c) the fuel correction amount FAFKGD is within the second predetermined range.

Then, the ECU 40 determines that the fuel system is normal (i.e., the ECU 40 re-evaluates the fuel system as normal) under the conditions (a) and (b), on the condition that the value CKFKG of the ninth counter is equal to or larger than a normality determination upper limit KFKG as a preset threshold value. Referring to FIG. 11, a fuel system normality/abnormality determination process for detecting an abnormality in the fuel system and making a return-to-normal determination will be described in detail. The routine of FIG. 11 is repeatedly executed at certain time intervals.

As shown in FIG. 11, it is determined in step S40 whether there is an abnormality in the fuel system. More specifically, it is determined whether the fuel correction amount FAFKGD is outside the first predetermined range. If it is determined that the fuel system is in an abnormal condition (YES in step S40), the currently detected engine operating conditions (namely, the engine speed NEm, engine load KLm and the engine coolant temperature THWm) and the DI ratio rm are stored in step S41, and the current cycle of the routine ends. On the other hand, if it is determined that the fuel system is in a normal condition, namely, if the fuel correction amount FAFKGD is within the first predetermined range (NO in step S40), a return-to-normal determination process as described below is performed.

In the return-to-normal determination process, it is initially determined in step S42 whether similar operating conditions are established. More specifically, it is determined whether the currently detected engine speed NE and engine load KL are within the range NEm±a of engine speed and the range KLm±b of engine load, respectively, and whether the state (warm state or cold state) of the current engine coolant temperature THW coincides with the state of the engine coolant temperature THWm. If the similar operating conditions are established (YES in step S42), it is determined in step S43 whether the DI ratio r detected at this time is equal to or within a predetermined range of the DI ratio rm obtained when an abnormality in the fuel system is detected. More specifically, it is determined whether the DI ratio r is equal to or larger than a lower limit rm−x based on which a similarity between the DI ratio r and the stored DI ratio rm is determined, and is equal to or smaller than an upper limit rm+x based on which a similarity between the DI ratio r and the stored DI ratio rm is determined. If the DI ratio r is equal to or within the predetermined range of the DI ratio rm (YES in step S43), it is determined in step S44 whether the fuel correction amount FAFKGD is within the second predetermined range. More specifically, it is determined whether the fuel correction amount FAFKGD is equal to or larger than the lean normality determination value FAFKGDLok, and is equal to or smaller than the rich normality determination value FAFKGDHok. If the fuel correction amount FAFKGD is within the second predetermined range (YES in step S44), the ninth counter is incremented in step S45.

Then, it is determined in step S46 whether the value CKFKG of the ninth counter is equal to or larger than the normality determination upper limit KFKG. If the value CKFKG of the ninth counter is equal to or larger than the normality determination upper limit KFKG (YES in step S46), the fuel system is determined as normal under the engine operating conditions and DI ratio r detected in step S42. Then, in step S47, it is determined that the fuel system is normal (namely, the fuel system is re-evaluated as normal) under the above-indicated engine operating conditions and DI ratio r. On the other hand, if the value CKFKG of the ninth counter is smaller than the normality determination upper limit KFKG (NO in step S46), the fuel system is determined as being kept in an abnormal condition under the above-indicated engine operating conditions and DI ratio r, and the current cycle of the routine ends.

When the similar operating conditions are not established (NO in step S42), or when the DI ratio r is not equal to nor within the predetermined range of the DI ratio rm obtained when the fuel system is abnormal (NO in step S43), or when the fuel correction amount FAFKGD is not within the second predetermined range (NO in step S44), the value CKFKG of the ninth counter is set to "0" in step S48. Since it is determined in step S46 whether the value CKFKG of the ninth counter is equal to or larger than the normality determination upper limit KFKG in this condition (where the value CKFKG is equal to "0"), the fuel system is not re-evaluated as normal, i.e., it is not determined that the fuel system returns to a normal operating state. This embodiment provides effects similar to the effects (1) and (2) of the first embodiment.

The specific configuration of the abnormality diagnosing system of the internal combustion engine according to the invention is not limited to those illustrated by way of example in the above embodiments, but may be changed as follows. Each of the following modified examples is not independently applied only to the selected one(s) of the illustrated embodiments, but different modified examples may be combined together and implemented.

Figure 12:
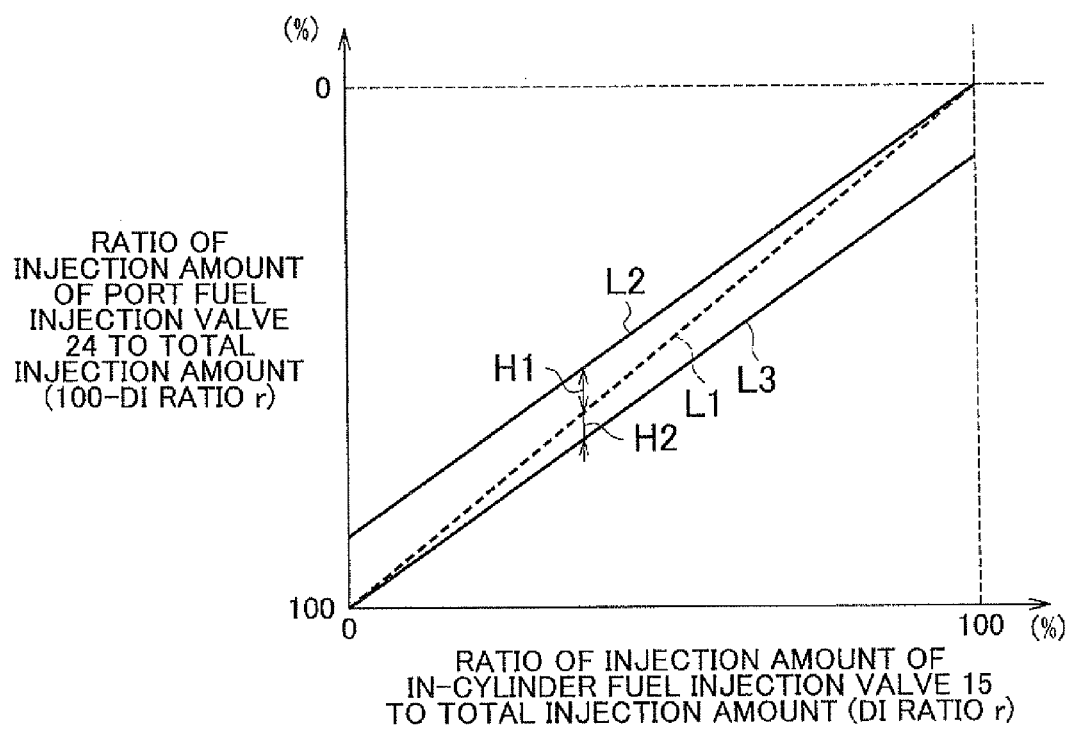
FIG. 12 is a graph showing the upper limit and lower limit of a DI ratio, for use in an abnormality diagnosing system of an internal combustion engine according to another embodiment of the invention.

In the third embodiment, it is determined in step S43 as shown in FIG. 11 whether the current DI ratio r is within the predetermined range of the DI ratio rm stored when the fuel system was abnormal, and the predetermined range is defined by a positive constant and a negative constant having the same absolute value. However, the range of the DI ratio is not limited to this range. For example, as shown in FIG. 12, straight line L2 and straight line L3 having different gradients may be plotted with respect to a straight line L1 indicating the value of the DI ratio rm stored upon detection of an abnormality in the fuel system, such that the straight line L2 indicates the upper limit, and the straight line L3 indicates the lower limit. In this case, the range of the DI ratio rm is equal to or larger than the straight line L3 indicative of the lower limit, and is equal to or smaller than the straight line L2 indicative of the upper limit. The upper limit relative to the DI ratio rm is defined by a difference H1 between the straight line L1 and the straight line L2, and the lower limit relative to the DI ratio rm is defined as a difference H2 between the straight line L1 and the straight line L3. Here, the difference H1 between the straight line L1 and the straight line L2 becomes the maximum value when the DI ratio rm is "0%", and decreases as the DI ratio rm increases. Then, the difference H1 becomes equal to "0" when the DI ratio rm is "100%". On the other hand, the difference H2 between the straight line L1 and the straight line L3 becomes equal to "0" when the DI ratio rm is "0%", and increases as the DI ratio rm increases. Then, the difference 112 becomes the maximum value when the DI ratio rm is "100%". By determining the range of the DI range rm in this manner, the upper limit and lower limit relative to the DI ratio rm at which an abnormality occurs in the fuel system are variably set.

In the third embodiment, it is determined whether the fuel correction amount FAFKGD is richer than the rich determination value FAFKGDH, or the fuel correction amount FAFKGD is leaner than the lean determination value FAFKGDL, in order to determine whether an abnormality occurs in the fuel system in step S40 as shown in FIG. 11. However, the method of determining an abnormality in the fuel system is not limited to this method.

For example, the ECU 40 may be provided with counters for detecting an abnormality in the fuel system, with respect to respective injection patterns of the in-cylinder fuel injection valve 15 and the port fuel injection valve 24. Namely, the ECU 40 is provided with a fuel system abnormality counter C1 used when "DI ratio r=100%", a fuel system abnormality counter C2 used when "DI ratio r=0%", and a fuel system abnormality counter C3 used when "0%<DI ratio r<100%". With this arrangement, when an abnormality occurs in the fuel system in each injection pattern, it can be determined whether the abnormality is caused by the in-cylinder fuel injection valve 15, or the port fuel injection valve 24, or both of the in-cylinder fuel injection valve 15 and the port fuel injection valve 24.

More specifically, the above determination can be made by applying the status of the counters C1-C3 to four patterns as shown in FIG. 13, within a set period of time (e.g. within 3 seconds). Then, the DI ratio r obtained based on the result of the determination is stored in the ECU 40, for use in setting of the similar operating conditions.

Namely, if the counter status indicates that the counter C1 is larger than "0", and the counter C2 is kept at "0", the ECU 40 stores information that the in-cylinder fuel injection valve 15 is at fault or in an abnormal condition. If the counter C3 is larger than "0", the ECU 40 stores information that the abnormality in the fuel system occurs due to an influence of the in-cylinder fuel injection valve 15.

If the counter status indicates that the counter C2 is larger than "2", the ECU 40 stores information that the port fuel injection valve 24 is at fault or in an abnormal condition. If the counter C3 is larger than "0", the ECU 40 stores information that the abnormality occurs due to an influence of the port fuel injection valve 24.

If the counter status indicates that both of the counter C1 and the counter C2 are larger than "0", it is determined that both of the in-cylinder fuel injection valve 15 and the port fuel injection valve 24 are at faulty or in abnormal conditions. In this case, it is understood that the abnormality in the fuel system is caused by the failures of the fuel injection valves with respect to the entire range of the DI ratio r; therefore, the ECU 40 need not store the injection pattern.

If the counter status indicates that both of the counter C1 and the counter C2 are kept at "0", and the counter C3 is larger than "0", the ECU 40 stores information that the abnormality in the fuel system occurs when both of the in-cylinder fuel injection valve 15 and the port fuel injection valve 24 are used. In this case, the ECU 40 further stores the DI ratio r detected at this time.

In each of the illustrated embodiments, the ECU 40 stores the DI ratio rm detected when an excessive number of misfires occur or an abnormality occurs in the fuel system, and the range rm±x of the DI ratio is set as one of the similar operating conditions. However, setting of the similar operating conditions is not limited to this. For example, the ECU 40 may store, as a similar operating condition, information as to which of the injection patterns, "DI ratio r=100%", "DI ratio r=0%" and "0%<DI ratio r<100%", in which the engine 1 operates at the time of occurrence of the abnormality, in place of the DI ratio rm. More specifically, if an excessive number of misfires occur or an abnormality occurs in the fuel system when "0%<DI ratio r<100%", for example, the ECU 40 stores "0%<DI ratio rm<100%" as a similar operating condition. Then, the ECU 40 determines whether the current injection pattern satisfies the similar operating condition that "0%<DI ratio rm<100%". With this arrangement, too, a return-to-normal determination is not made unless the injection pattern, as well as the engine speed NE, engine load KL and the engine coolant temperature THW, is the same as that stored as the similar operating condition; it is therefore possible to reduce the frequency of occasions where the engine is determined as returning to a normal operating state even if the injection pattern is different from that detected at the time of occurrence of the abnormality, which occasions would occur when a return-to-normal determination is made only based on the above-described engine operating conditions of NE, KL and THW.

While the threshold value C is set to a value smaller than the threshold value A in the first and second embodiments, the threshold value C and the threshold value A may be set to substantially the same values. While the ECU 40 is provided with both of the first counter and the second counter in the first and second embodiments, the ECU 40 may be provided with only one of the first counter and the second counter.

While the invention has been described with reference to the example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

What is claimed is:
1. An abnormality diagnosing system for an internal combustion engine including a first fuel injection valve that injects fuel into a cylinder, and a second fuel injection valve that injects fuel into an intake passage, comprising:
a control device that controls an injection pattern of the first fuel injection valve and the second fuel injection valve, said control device being configured to store engine operating conditions of an engine speed, an engine load and an engine coolant temperature when an abnormality occurs in the internal combustion engine, and make a return-to-normal determination as to whether the engine returns to a normal operating state when similar operation conditions that are the same as or within predetermined ranges of the stored engine operating conditions are established, wherein
the injection pattern is selected from a first pattern in which the fuel is injected solely from the first fuel injection valve, a second pattern in which the fuel is injected solely from the second fuel injection valve, and a third pattern in which the fuel is injected from both of the first fuel injection valve and the second fuel injection valve; and
the control device stores the injection pattern when the abnormality occurs, and makes a return-to-normal determination on condition that the engine is operating in an injection pattern that is the same as the stored injection pattern.

2. The abnormality diagnosing system according to claim 1, wherein the control device controls an injection ratio as a ratio of an injection amount of the first fuel injection valve to a total amount of the injection amount of the first fuel injection valve and that of the second fuel injection valve, said control device being configured to store the injection ratio at the time when an abnormality occurs in the internal combustion engine, and makes a return-to-normal determination as to whether the engine returns to a normal operating state on condition that a similar injection ratio that is equal to or within a predetermined range of the stored injection ratio is established.

3. The abnormality diagnosing system according to claim 2, wherein:
the abnormality in the internal combustion engine is occurrence of an excessive number of misfires; and
the control device determines at each first predetermined period whether the abnormality occurs in the internal combustion engine within the first predetermined period, and determines at each second predetermined period whether the abnormality occurs in the internal combustion engine within the second predetermined period, said second predetermined period being different from the first predetermined period.

4. The abnormality diagnosing system according to claim 2, wherein:
the abnormality in the internal combustion engine is occurrence of an excessive number of misfires; and
the control device has a first threshold value of the number of misfires based on which it is determined whether the abnormality occurs in the engine, and a second threshold value of the number of misfires based on which a return-to-normal determination as to whether the engine returns to a normal operating state is made, said second threshold value being smaller than the first threshold value.

5. The abnormality diagnosing system according to claim 2, wherein:
the abnormality in the internal combustion engine is occurrence of an excessive number of misfires;
the control device determines whether a currently detected air/fuel ratio is within a predetermined range; and
when the air/fuel ratio is within the predetermined range, the control device makes a return-to-normal determination while being inhibited from making a determination as to whether the similar injection ratio that is equal to or within the predetermined range of the stored injection ratio is established.

6. The abnormality diagnosing system according to claim 2, wherein:
the abnormality in the internal combustion engine is an abnormality in a fuel system;
the control device determines that there is an abnormality in the fuel system when a fuel correction amount of the first fuel injection valve or a fuel correction amount of the second fuel injection valve is outside a first predetermined range set in advance for determining normality of the fuel system; and
when both of the fuel correction amount of the first fuel injection valve and the fuel correction amount of the second fuel injection valve are within the first predetermined range, the control device determines that the engine returns to a normal operating state under the similar operating conditions, on the conditions that the similar injection ratio that is equal to or within the predetermined range of the stored injection ratio is established, and that both of the fuel correction amount of the first injection valve and the fuel correction amount of the second fuel injection valve are within a second predetermined range that is narrower than the first predetermined range.

7. The abnormality diagnosing system according to claim 6, wherein the control device variably set a range that defines the similar injection ratio, according to the injection ratio obtained when the abnormality in the fuel system is detected.

8. The abnormality diagnosing system according to claim 6, wherein the control device has a counter for use in detection of an abnormality in the fuel system, with respect to each of the injection patterns.

9. The abnormality diagnosing system according to claim 1, wherein:
the abnormality in the internal combustion engine is occurrence of an excessive number of misfires; and
the control device determines at each first predetermined period whether the abnormality occurs in the internal combustion engine within the first predetermined period, and determines at each second predetermined period whether the abnormality occurs in the internal combustion engine within the second predetermined period, said second predetermined period being different from the first predetermined period.

10. The abnormality diagnosing system according to claim 9, wherein the control device has a first threshold value of the number of misfires based on which it is determined whether the abnormality occurs in the engine, and a second threshold value of the number of misfires based on which a return-to-normal determination as to whether the engine returns to a normal operating state is made, said second threshold value being smaller than the first threshold value.

11. The abnormality diagnosing system according to claim 9, wherein:
the control device determines whether a currently detected air/fuel ratio is within a predetermined range; and
when the air/fuel ratio is within the predetermined range, the control device makes a return-to-normal determination while being inhibited from making a determination as to whether the similar injection ratio that is equal to or within the predetermined range of the stored injection ratio is established.

12. The abnormality diagnosing system according to claim 1, wherein:
the abnormality in the internal combustion engine is occurrence of an excessive number of misfires; and
the control device has a first threshold value of the number of misfires based on which it is determined whether the abnormality occurs in the engine, and a second threshold value of the number of misfires based on which a return-to-normal determination as to whether the engine returns to a normal operating state is made, said second threshold value being smaller than the first threshold value.

13. The abnormality diagnosing system according to claim 12, wherein:
the control device determines whether a currently detected air/fuel ratio is within a predetermined range; and
when the air/fuel ratio is within the predetermined range, the control device makes a return-to-normal determination while being inhibited from making a determination as to whether the similar injection ratio that is equal to or within the predetermined range of the stored injection ratio is established.

14. The abnormality diagnosing system according to claim 1, wherein:
the abnormality in the internal combustion engine is an abnormality in a fuel system;
the control device determines that there is an abnormality in the fuel system when a fuel correction amount of the first fuel injection valve or a fuel correction amount of the second fuel injection valve is outside a first predetermined range set in advance for determining normality of the fuel system; and
when both of the fuel correction amount of the first fuel injection valve and the fuel correction amount of the second fuel injection valve are within the first predetermined range, the control device determines that the engine returns to a normal operating state under the similar operating conditions, on the conditions that the injection pattern is the same as that stored at the time of occurrence of the abnormality, and that both of the fuel correction amount of the first fuel injection valve and the fuel correction amount of the second fuel injection valve are within a second predetermined range that is narrower than the first predetermined range.

15. The abnormality diagnosing system according to claim 14, wherein the control device has a counter for use in detection of an abnormality in the fuel system, with respect to each of the injection patterns.

* * * * *